United States Patent
Ikeda

(10) Patent No.: US 9,673,866 B2
(45) Date of Patent: Jun. 6, 2017

(54) COMMUNICATION SYSTEM AND COMMUNICATION DEVICE

(71) Applicant: Murata Manufacturing Co., Ltd., Nagaokakyo-shi, Kyoto-fu (JP)

(72) Inventor: Naoto Ikeda, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/068,777

(22) Filed: Mar. 14, 2016

(65) Prior Publication Data

US 2016/0197649 A1 Jul. 7, 2016

Related U.S. Application Data

(63) Continuation of application No. PCT/JP2014/074038, filed on Sep. 11, 2014.

(30) Foreign Application Priority Data

Sep. 17, 2013 (JP) .................................. 2013-191310

(51) Int. Cl.
*H04B 5/00* (2006.01)
*G06F 1/26* (2006.01)
(Continued)

(52) U.S. Cl.
CPC ............ *H04B 5/0031* (2013.01); *G06F 1/26* (2013.01); *H01Q 1/2291* (2013.01);
(Continued)

(58) Field of Classification Search
CPC .................................................. H04B 5/0031
See application file for complete search history.

(56) References Cited

U.S. PATENT DOCUMENTS 8,680,811 B2    3/2014 Mochida et al.
2006/0158152 A1*  7/2006 Taniguchi ............... H02J 7/025
                                                      320/106

FOREIGN PATENT DOCUMENTS

JP    2006-201959 A    8/2006
JP    2009-247125 A   10/2009
(Continued)

OTHER PUBLICATIONS

Official Communication issued in International Patent Application No. PCT/JP2014/074038, mailed on Oct. 14, 2014.

*Primary Examiner* — Tuan H Nguyen
(74) *Attorney, Agent, or Firm* — Keating & Bennett, LLP

(57) ABSTRACT

A communication system includes a first communication device that operates using a battery as a main power source and a second communication device that communicates with the first communication device. The second communication device includes a second high-speed data communication unit including a second data communication antenna and a second short-range communication unit including a second magnetic-field antenna for short-range communication. The first communication device includes a first short-range communication unit including a first magnetic-field antenna and a first high-speed data communication unit including a first data communication antenna. When an electromotive voltage of the battery lowers, switches are turned OFF and electric power from a power conversion circuit including a rectifying circuit and a DC-to-DC converter is supplied to a communication controller.

18 Claims, 3 Drawing Sheets

(51) Int. Cl.
  *H02J 17/00* (2006.01)
  *H01Q 1/22* (2006.01)
  *H01Q 1/24* (2006.01)
  *H01Q 21/28* (2006.01)
  *H04W 4/00* (2009.01)
  *H02J 50/00* (2016.01)

(52) U.S. Cl.
  CPC ............ *H01Q 1/243* (2013.01); *H01Q 1/248* (2013.01); *H01Q 21/28* (2013.01); *H02J 17/00* (2013.01); *H04B 5/0037* (2013.01); *H04B 5/0075* (2013.01); *H04W 4/008* (2013.01); *H02J 50/00* (2016.02)

(56) References Cited

FOREIGN PATENT DOCUMENTS

| JP | 2011-045190 A |   | 3/2011  |         |
|----|---------------|---|---------|---------|
| JP | 2012-195784   | * | 10/2012 | ............. H04M 1/73 |
| JP | 2012-195784 A |   | 10/2012 |         |
| JP | 2013-097224 A |   | 5/2013  |         |
| JP | 2013-162672   | * | 8/2013  | ................ H02J 7/00 |
| JP | 2013-162672 A |   | 8/2013  |         |

\* cited by examiner

COMMUNICATION SYSTEM AND COMMUNICATION DEVICE

BACKGROUND OF THE INVENTION

1. Field of the Invention

The present invention relates to a communication system and a communication device that perform communication between two communication devices over a short range.

2. Description of the Related Art

When large-capacity data such as pictures and videos stored in a mobile terminal is transferred to a stationary terminal such as a personal computer (PC), a method in which the terminals communicate with each other by wire using a local area network (LAN), a universal serial bus (USB), or the like, a method in which the terminals communicate with each other using a wireless LAN, and a method in which the terminals communicate with each other by proximity high-speed wireless communication using TransferJet (registered trademark) or the like have been used generally.

However, these communication methods require a battery of the mobile terminal to be charged before data communication when a residual quantity of the battery runs out and it cannot make communication for a long period of time during the charging.

In order to cope with this, for example, as disclosed in Japanese Unexamined Patent Application Publication No. 2009-247125, a method for enabling a mobile terminal to make communication with no need to wait for completion of charging by alternately performing charging to a battery and data communication has been proposed.

However, the method as disclosed in Japanese Unexamined Patent Application Publication No. 2009-247125 requires a communication device to have a wireless charging function and an application range thereof is limited. Further, there also arises a problem that data communication cannot be performed when the battery breaks down and so on and abnormality occurs in a charging operation.

SUMMARY OF THE INVENTION

Preferred embodiments of the present invention provide a communication system that does not require a configuration for wireless charging and enables data communication between communication devices even under a situation where an operation with a battery cannot be performed.

A communication system according to a preferred embodiment of the present invention includes a first communication device that operates using a battery as a main power source and a second communication device that communicates with the first communication device, wherein the first communication device includes a data processor including a main central processing unit (CPU) operating using the main power source as a power source, a first high-speed data communication unit including a first data communication antenna and a first data communication circuit connected to the first data communication antenna, a first short-range communication unit including a first magnetic-field antenna for short-range communication, a first short-range communication circuit connected to the first magnetic-field antenna, and a data communication CPU that operates with smaller power consumption than the main CPU, and a power conversion circuit that converts a signal from the first magnetic-field antenna to electric power and supplies the electric power to the data processor, and the second communication device includes a second high-speed data communication unit including a second data communication antenna and a second data communication circuit that performs data communication using the second data communication antenna, and a second short-range communication unit including a second magnetic-field antenna for short-range communication and a second short-range communication circuit connected to the second magnetic-field antenna.

With the above-described structure, the first communication device is able to obtain the power from the signal that has passed through the magnetic-field antenna so as to perform the data communication. Therefore, high-speed data communication between the communication devices is able to be performed even under a situation where the first communication device cannot operate with the battery.

It is preferable that the first communication device include a switch that controls power source supply to the data processor or an operation of the main CPU, and a power supply switching unit that switches the switch to block the power source supply to the data processor or to stop the operation of the main CPU when electric power or a voltage which is supplied from the main power source is lower than a threshold value. With this structure, waste consumption of the power obtained from the signal that has passed through the magnetic-field antenna is significantly reduced or prevented.

It is preferable that the data processor includes a circuit that performs processing on camera-shot data, for example, and the first high-speed data communication unit of the first communication device includes a circuit that transfers the camera-shot data to the second communication device.

It is preferable that the first short-range communication unit of the first communication device and the second short-range communication unit of the second communication device perform communication for authentication. With this structure, for example, even when authentication between the communication devices cannot be made in data communication such as proximity high-speed wireless communication, the authentication is able to be made by short-range communication. Therefore, both of security performance and transfer speed are able to be achieved.

According to another preferred embodiment of the present invention, a first communication device includes a data processor including a main CPU operating using a main power source including a battery as a power source, a first high-speed data communication unit including a first data communication antenna and a first data communication circuit connected to the first data communication antenna, a first short-range communication unit including a first magnetic-field antenna for short-range communication, a first short-range communication circuit connected to the first magnetic-field antenna, and a data communication CPU that operates with smaller power consumption than the main CPU, and a power conversion circuit that converts a signal from the first magnetic-field antenna to electric power and supplies the electric power to the data processor.

With the above-described structure, the first communication device is able to obtain the power from the signal that has passed through the magnetic-field antenna so as to perform the data communication. Therefore, high-speed data communication between communication devices is able to be performed even under a situation where the first communication device cannot operate with the battery.

It is preferable that the first communication device further include a switch that controls a power source supply to the data processor or an operation of the main CPU, and a power supply switching unit that switches the switch to block the power source supply to the data processor or to stop the operation of the main CPU when electric power or a voltage which is supplied from the main power source is lower than a threshold value. With this structure, waste consumption of power obtained from the signal that has passed through the magnetic-field antenna is significantly reduced or prevented.

According to various preferred embodiments of the present invention, the first communication device is able to obtain the power from the signal that has passed through the magnetic-field antenna so as to perform the data communication. Therefore, high-speed data communication between communication devices is able to be performed even under a situation where the first communication device cannot operate with the battery.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
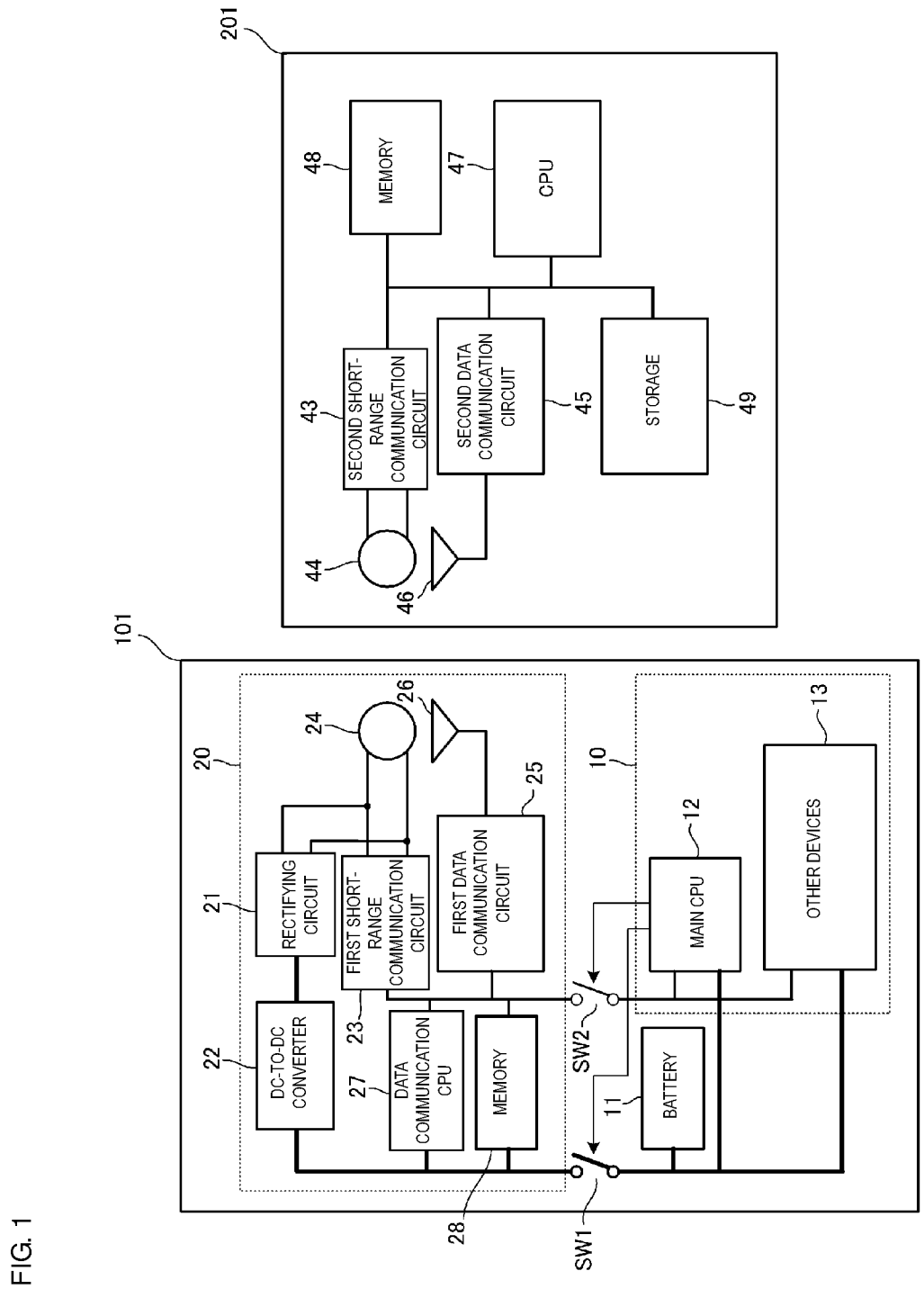
FIG. 1 is a block diagram of a communication system according to a preferred embodiment of the present invention.

FIG. 1 is a block diagram of a communication system according to a preferred embodiment of the present invention. The communication system preferably includes a first communication device 101 and a second communication device 201. The first communication device 101 is a device that holds data of relatively large capacity in a memory or the like, and is a mobile device such as a digital camera and a cellular phone, for example. The second communication device 201 is a data storage device including such as a large-capacity storage, and is a stationary device such as a personal computer (PC). Short-range wireless communication is communication (a typical example thereof is near field communication (NFC)) using a high frequency (HF) band, for example, and high-speed data communication is communication (typical examples thereof are wireless LAN, Bluetooth (registered trademark), and TransferJet (registered trademark)) using an ultra high frequency (UHF) band or a super high frequency (SHF) band, for example.

The first communication device 101 includes a data processor 10 and a communication controller 20. The data processor 10 includes a circuit with relatively large power consumption, which performs pieces of processing on image data, audio data, and the like, and includes a main CPU 12 and other devices 13. The communication controller 20 includes a circuit with relatively smaller power consumption than the data processor 10 and includes a rectifying circuit 21, a DC-to-DC converter 22, a first short-range communication circuit 23, a first magnetic-field antenna 24, a first data communication circuit 25, a first data communication antenna 26, a data communication CPU 27, and a memory 28.

The first communication device 101 includes a battery 11 as a main power source and further includes switches SW1 and SW2. Actions of these switches SW1 and SW2 will be described later. The battery 11 is a secondary battery such as a lithium ion battery, for example.

The second communication device 201 includes a second short-range communication circuit 43, a second magnetic-field antenna 44, a second data communication circuit 45, a second data communication antenna 46, a CPU 47, a memory 48, and a storage 49 such as a hard disk.

In the first communication device 101 and the second communication device 201, the first short-range communication circuit 23 and the second short-range communication circuit 43 are NFC communication modules, for example. Further, the first data communication circuit 25 and the second data communication circuit 45 are wireless LAN communication modules, Bluetooth (registered trademark) communication modules, or TransferJet (registered trademark) communication modules, for example. The first short-range communication circuit 23 and the first magnetic-field antenna 24 define a "first short-range communication unit" on the first communication device 101 side. Further, the second short-range communication circuit 43 and the second magnetic-field antenna 44 define a "second short-range communication unit" on the second communication device 201 side. The first data communication circuit 25 and the first data communication antenna 26 define a "first high-speed data communication unit" on the first communication device 101 side. Further, the second data communication circuit 45 and the second data communication antenna 46 define a "second high-speed data communication unit" on the second communication device 201 side.

The other devices 13 in the first communication device 101 are a camera module, a display panel, an input interface to receive operations of a user, and the like, for example. The main CPU 12 performs pieces of processing such as reading by the input interface, shooting by the camera module, processing on shot image data, display control on the display panel, and writing of the image data into the memory 28, for example.

The first short-range communication circuit 23 of the first communication device 101 and the second short-range communication circuit 43 of the second communication device 201 perform short-range communication with each other and perform authentication processing, for example. The first data communication circuit 25 in the first communication device 101 and the second data communication circuit 45 in the second communication device 201 perform the high-speed data communication with each other and transfer data shot by the camera, for example, to the second communication device 201 from the first communication device 101.

Each of the first magnetic-field antenna 24 and second magnetic-field antenna 44 preferably is a loop antenna or a spiral coil antenna, for example, and they are coupled to each other with a magnetic field mainly. The first data communication antenna 26 and the second data communication antenna 46 are electric-field antennas which are coupled to each other with an induction electric field mainly, for example. Both of them can be coupled to each other in a near field and the first communication device 101 and the second communication device 201 are therefore able to perform communication in a proximity state of being located close to each other, i.e., in a range of approximately several centimeters, for example.

In the first communication device 101, the rectifying circuit 21 and the DC-to-DC converter 22 define a "power conversion circuit". The rectifying circuit 21 rectifies a voltage current (carrier signal) induced by the first magnetic-field antenna 24. The DC-to-DC converter 22 is supplied with the voltage current converted into a direct current by the rectifying circuit 21 and generates a predetermined DC power source voltage. That is to say, the rectifying circuit 21 and the DC-to-DC converter 22 convert a signal for the short-range communication into electric power and the electric power is supplied to the communication controller 20.

The switch SW1 is a switch connected to a power source line and the switch SW2 is a switch connected to a signal line. The switches SW1 and SW2 are normal-off switch circuits in terms of circuits. The switch SW1 also corresponds to a "power supply switching unit".

In the first communication device 101, in a state where the battery 11 has sufficient residual quantity and a predetermined electromotive voltage, the main CPU 12 turns the switches SW1 and SW2 into ON states. Accordingly, the power source voltage of the battery 11 is supplied to the data processor 10 and the communication controller 20.

In a state where the residual quantity of the battery 11 runs out substantially and the electromotive voltage of the battery 11 is lower than a threshold value (electromotive voltage necessary for a normal operation), the switches SW1 and SW2 are turned into OFF states. In this state, when the first magnetic-field antenna 24 receives a signal from the second magnetic-field antenna 44 of the second communication device 201, the communication controller 20 operates using an output voltage from the DC-to-DC converter 22 as a power source. Accordingly, the communication controller 20 is able to perform data communication using the first high-speed data communication unit (25 and 26) while receiving power from the short-range communication unit. It should be noted that when the switch SW1 is still in the ON state, at this time, the power converted by the power conversion circuit is consumed by the battery and the main CPU. However, the switch SW1 is turned OFF and the power converted by the power conversion circuit is not therefore supplied to the data processor 10 wastefully but is supplied to the communication controller 20 effectively. That is to say, when the residual quantity of the battery substantially runs out or is zero, the rectifying circuit 21 and the DC-to-DC converter 22 supply the power to only the communication controller 20 with relatively small power consumption. Therefore, the communication controller 20 is able to operate even with the power that is received when communication is performed by NFC, for example.

Even when the battery breaks down or when a power supply circuit using the battery as an input power source breaks down in addition to the case of discharging of the battery 11, the switches SW1 and SW2 are turned into the OFF states and the above-described data transfer is able to be performed.

It should be noted that the switch SW2 connected to the signal line may not be necessarily provided. The switch SW2 is not required as long as the operation of the data processor stops with lowering of the electromotive voltage of the battery 11 without causing the operation of the data processor 10 to be unstable.

Figure 2:
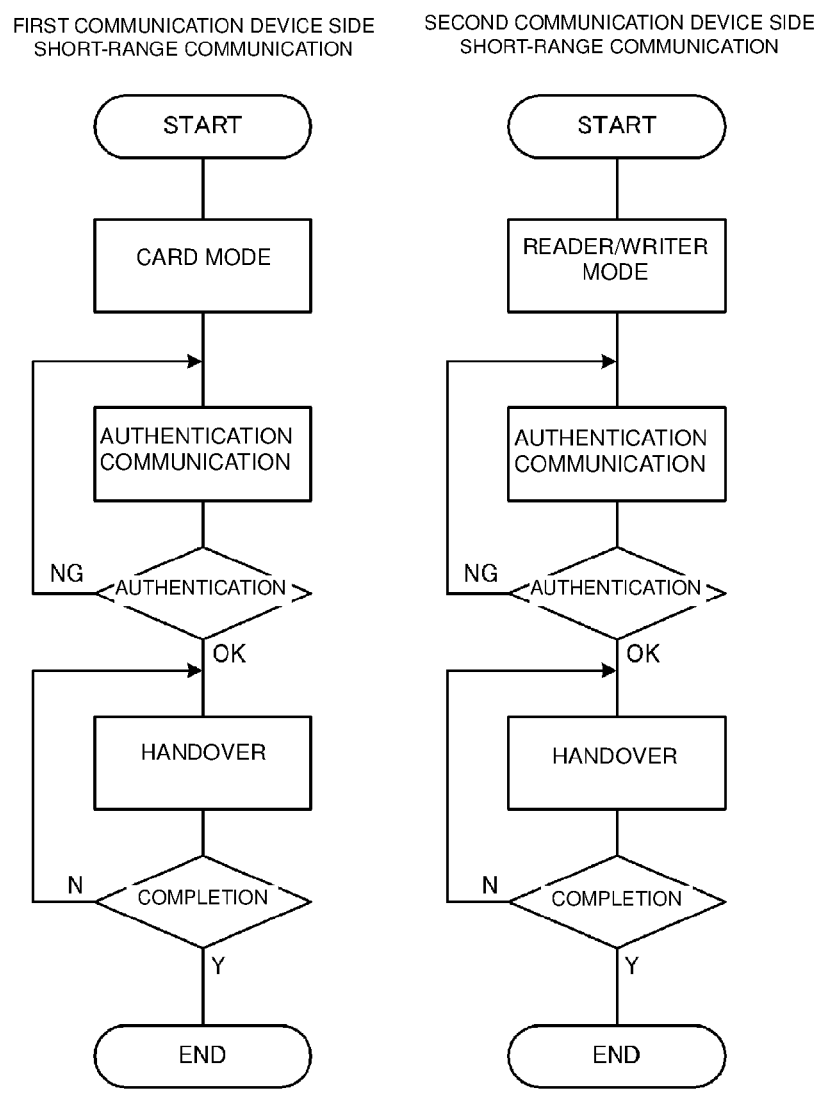
FIG. 2 is a flowchart illustrating a processing example of short-range communication that is performed between a first communication device 101 and a second communication device 201.
Figure 3:
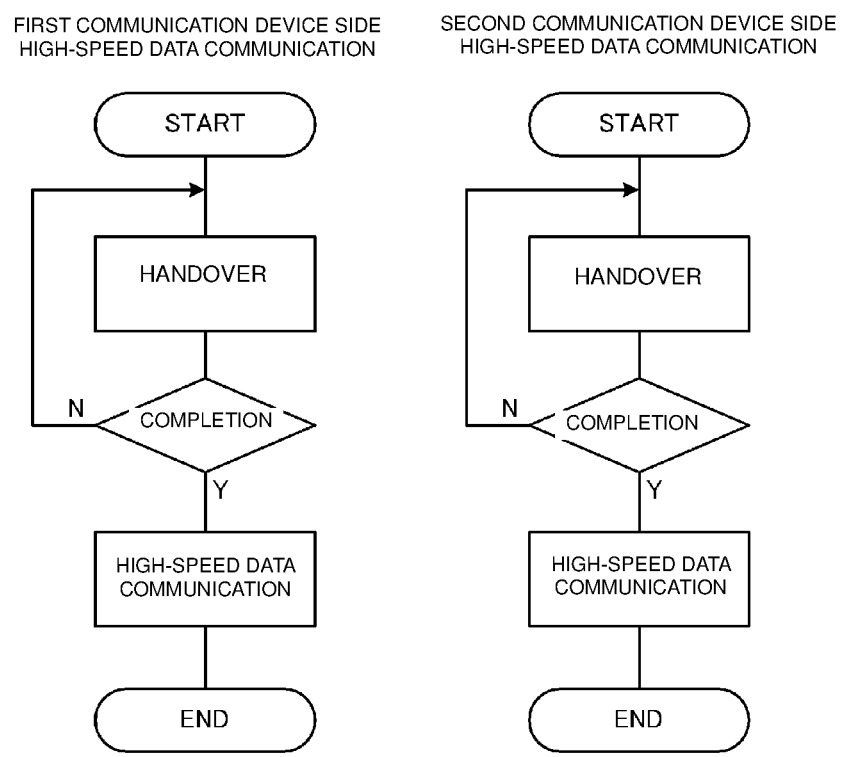
FIG. 3 is a flowchart illustrating a processing example of high-speed data communication that is performed between the first communication device 101 and the second communication device 201.

FIG. 2 is a flowchart illustrating a processing example of the short-range communication that is performed between the first communication device 101 and the second communication device 201. FIG. 3 is a flowchart illustrating a processing example of the high-speed data communication that is performed between the first communication device 101 and the second communication device 201. For example, first, the second short-range communication circuit 43 of the second communication device 201 is set to be in a reader/writer mode (as an initiator) and an operation is started. Thereafter, the first communication device 101 is located close to the second communication device 201. The first short-range communication circuit 23 of the first communication device 101 is in a card mode (operates as a responder) normally. Therefore, when the first communication device 101 is located close to the second communication device 201, the first short-range communication circuit 23 of the first communication device 101 responds to inquiry from the second short-range communication circuit 43 of the second communication device 201. As illustrated in FIG. 2, when predetermined authentication processing is successful, processing for handover to the high-speed data communication is performed. On the other hand, when the authentication processing is not successful, the first communication device 101 and the second communication device 201 are returned to be in standby states.

As illustrated in FIG. 3, when the above-mentioned handover is completed, predetermined high-speed data communication is performed. For example, image data is transferred to the second communication device 201 from the first communication device 101.

Thus, security level is enhanced by performing authentication using the short-range communication such as the NFC before the data communication.

In the example as illustrated in FIG. 1, the switches SW1 and SW2 preferably are normal-off switches and are the switch circuits that are turned ON by a control signal from the main CPU 12. That is to say, the switch SW1 also corresponds to the "power supply switching unit". Alternatively, a circuit detecting the voltage of the battery 11 may be provided separately from the main CPU so as to control the switches SW1 and SW2. Moreover, the data communication CPU 27 may detect the voltage of the battery 11 so as to control the switches SW1 and SW2. In this manner, the "power supply switching unit" may be provided separately from the switches.

The main CPU 12 preferably includes a C-MOS circuit. Therefore, an operation may be stopped and power consumption may be reduced by stopping a clock instead of the block of the power source supply. The same holds true for other devices.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A communication system comprising:
   a first communication device that operates using a battery as a main power source; and
   a second communication device that communicates with the first communication device; wherein
   the first communication device includes:
      a data processor including a main central processing unit (CPU) that operates using the main power source as a power source;
      a first high-speed data communication unit including a first data communication antenna and a first data communication circuit connected to the first data communication antenna;

a first short-range communication unit including a first magnetic-field antenna for short-range communication, a first short-range communication circuit connected to the first magnetic-field antenna, and a data communication CPU operating with smaller power consumption than the main CPU;

a power conversion circuit that converts a signal from the first magnetic-field antenna to electric power and supplies the electric power to the data processor;

a switch that controls power source supply to the data processor or an operation of the main CPU;

a power supply switching unit that switches the switch to block the power source supply to the data processor or to stop the operation of the main CPU when electric power or a voltage which is supplied from the main power source is lower than a threshold value; and the second communication device includes:

a second high-speed data communication unit including a second data communication antenna and a second data communication circuit that performs data communication using the second data communication antenna; and a second short-range communication unit including a second magnetic-field antenna for short-range communication and a second short-range communication circuit connected to the second magnetic-field antenna.

2. The communication system according to claim 1, wherein the data processor includes a circuit that performs processing on camera-shot data and the first high-speed data communication unit of the first communication device includes a circuit that transfers the camera-shot data to the second communication device.

3. The communication system according to claim 1, wherein the first short-range communication unit of the first communication device and the second short-range communication unit of the second communication device perform communication for authentication.

4. The communication system according to claim 1, wherein the first communication device is one of a phone and a camera.

5. The communication system according to claim 1, wherein the second communication device is a computer.

6. The communication system according to claim 1, wherein the first communication device and the second communication device perform short-range wireless communication that includes one of near field communication using a high frequency band, and high-speed data wireless communication using an ultra high frequency band or a super high frequency band.

7. The communication system according to claim 1, wherein the first communication device includes a communication controller including a rectifying circuit, a DC-to-DC converter, a first short-range communication circuit, a first magnetic-field antenna, a first data communication circuit, a first data communication antenna, a data communication CPU, and a memory.

8. The communication system according to claim 1, wherein the second communication device includes a second short-range communication circuit, a second magnetic-field antenna, a second data communication circuit, a second data communication antenna, a CPU, a memory, and a storage.

9. The communication system according to claim 1, wherein the first short-range communication circuit and the second short-range communication circuit are near field communication modules, and the first data communication circuit and the second data communication circuit are wireless communication modules.

10. The communication system according to claim 1, wherein each of the first magnetic-field antenna and second magnetic-field antenna is one of a loop antenna and a spiral coil antenna, for example, and each of the first data communication antenna and the second data communication antenna is an electric-field antenna.

11. The communication system according to claim 1, wherein the first communication device and the second communication device perform communication in a proximity state in a range of approximately several centimeters.

12. A communication device comprising:

a data processor including a main CPU that operates using a main power source that includes a battery as a power source;

a first high-speed data communication unit including a first data communication antenna and a first data communication circuit connected to the first data communication antenna;

a first short-range communication unit including a first magnetic-field antenna for short-range communication, a first short-range communication circuit connected to the first magnetic-field antenna, and a data communication CPU that operates with smaller power consumption than the main CPU;

a power conversion circuit that converts a signal from the first magnetic-field antenna to electric power and supplies the electric power to the data processor;

a switch that controls power source supply to the data processor or an operation of the main CPU; and a power supply switching unit that switches the switch to block the power source supply to the data processor or to stop the operation of the main CPU when electric power or a voltage which is supplied from the main power source is lower than a threshold value.

13. The communication device according to claim 12, wherein the data processor includes a circuit that performs processing on camera-shot data and the first high-speed data communication unit of the first communication device includes a circuit that transfers the camera-shot data to a second communication device.

14. The communication device according to claim 12, wherein the first short-range communication unit performs communication for authentication.

15. The communication device according to claim 12, wherein the communication device is one of a phone and a camera.

16. The communication device according to claim 12, wherein the communication device is a computer.

17. The communication device according to claim 12, wherein the communication device performs short-range wireless communication that includes one of near field communication using a high frequency band, and high-speed data wireless communication using an ultra high frequency band or a super high frequency band.

18. The communication device according to claim 12, wherein the communication device includes a communication controller including a rectifying circuit, a DC-to-DC converter, a first short-range communication circuit, a first magnetic-field antenna, a first data communication circuit, a first data communication antenna, a data communication CPU, and a memory.

* * * * *